(12) United States Patent
Gardi

(10) Patent No.: US 6,843,385 B2
(45) Date of Patent: Jan. 18, 2005

(54) CONTAINER FOR ELECTRONIC APPARATUS SUCH AS PERSONAL COMPUTERS, COMPACT DISC READERS AND FOR OBJECTS OF ONE'S OWN OR PROFESSIONAL USE IN GENERAL, WRITING AND DRAWING TOOLS, ETC

(75) Inventor: Chanan Gardi, Grassina (IT)

(73) Assignee: Editoriale S. R. L., Udine (IT)

( * ) Notice: Subject to any disclaimer, the term of this patent is extended or adjusted under 35 U.S.C. 154(b) by 16 days.

(21) Appl. No.: 10/614,560

(22) Filed: Jul. 7, 2003

(65) Prior Publication Data

US 2004/0104229 A1 Jun. 3, 2004

(30) Foreign Application Priority Data

Jul. 10, 2002 (IT) .................................. FI2002A0125

(51) Int. Cl.$^7$ ................................................ B65D 6/28
(52) U.S. Cl. .................... 220/4.22; 220/4.23; 220/4.24; 220/23.86
(58) Field of Search .............................. 220/4.22, 4.23, 220/4.24, 820, 821, 23.86

(56) References Cited

U.S. PATENT DOCUMENTS

| 5,095,923 | A | * | 3/1992 | Kramer | 131/296 |
| 6,019,239 | A | * | 2/2000 | Watson | 220/6 |
| 6,186,349 | B1 | * | 2/2001 | Tempongko | 220/4.22 |
| 6,311,859 | B1 | * | 11/2001 | Haas | 220/4.22 |

* cited by examiner

Primary Examiner—Joseph Man-Fu Moy
(74) Attorney, Agent, or Firm—McGlew and Tuttle, P.C.

(57) ABSTRACT

Container for electronic apparatus and for tools of one's own or professional use, characterized in that it comprises:—an openable case made up of a first half-shell (2) and a second half-shell (3) which are disposed substantially coplanar and connected to each other via a relevant hinge (4) in correspondence of a common corner, so that they can be disposed at least in a closed configuration in which they are juxtaposed, and an open position in which they are stretched apart;—at least a movable plane (5) able to be positioned internally of said half-shells (2, 3);—means for guiding the movement of said plane (5) relative to said half-shells (2, 3), which means consist of projections or pins (6) slidingly fitted within corresponding guides or slots (7, 8).

8 Claims, 6 Drawing Sheets

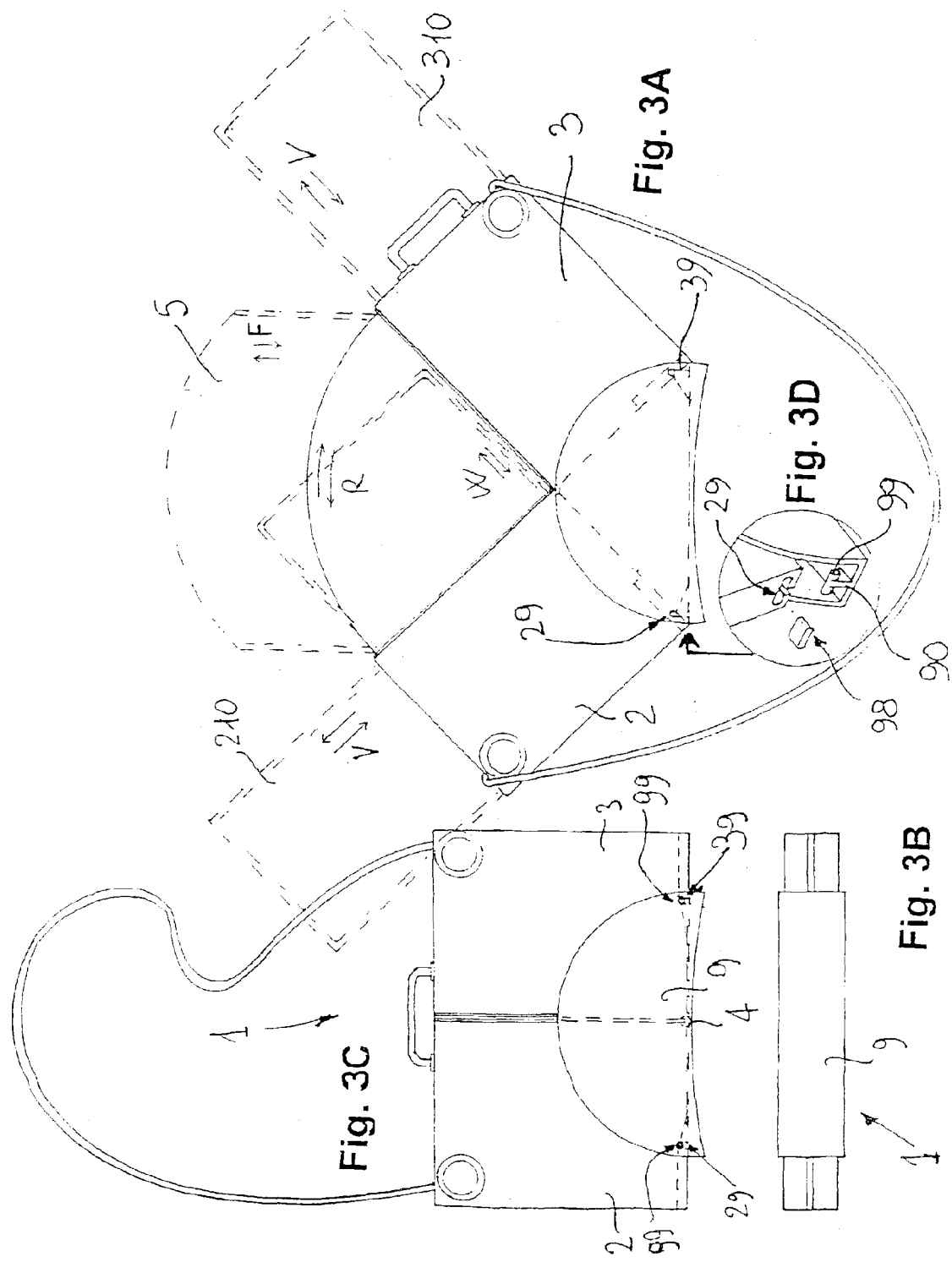

CONTAINER FOR ELECTRONIC APPARATUS SUCH AS PERSONAL COMPUTERS, COMPACT DISC READERS AND FOR OBJECTS OF ONE'S OWN OR PROFESSIONAL USE IN GENERAL, WRITING AND DRAWING TOOLS, ETC

The present invention refers to a container for electronic apparatus such as personal computers, compact disc readers and for objects of one's own or professional use in general, writing and drawing tools, etc.

At present, the housing and transportation of such portable device is made by using fabric bags, usually stuffed to protect the same devices against slight knocks and the contact thereof with other objects. One of the drawbacks of the known portable bags for computers lies in the substantial impossibility of using the computer inside its case. In fact, when such devices are used, they must be fully withdrawn from the relevant cases which, generally, hamper the normal use of the computer even if they are kept open.

A further drawback lies in the fact that the bags currently on the market allow using the computer only after the latter has been removed from the same bags and that a base, such as a table, is required for supporting it.

The main object of the present invention is to overcome the said drawbacks.

This result has been achieved, according to the invention, by adopting the idea of making a container for portable electronic apparatus having the features disclosed in the claim 1. Further characteristics being set forth in the dependent claims.

The advantages deriving from the present invention lie essentially in the fact that it is possible using a portable electronic apparatus inside the container in question; that the container allows one or more support planes to be used in conjunction with the computer; that the opening and closing of the container are easily and conveniently achieved; that the container in question can form the envelope or outer part of the same apparatus; that the present container makes it possible to use the relevant equipment while the user stands up; that the container can be made from plastics material with significant saving in the whole production process; that the container results considerably robust and resistant; that the container includes a limited number of components and, accordingly, is cost-effective as far as the manufacturing and stock-control steps are concerned.

These and other advantages and characteristics of the invention will be best understood by anyone skilled in the art from a reading of the following description in conjunction with the attached drawings given as a practical exemplification of the invention, but not to be considered in a limitative sense, wherein:

FIGS. 1A, 1B, 1C, 1D, 1E, 1F show schematically an exemplary embodiment of a container according to the present invention in, respectively, a perspective view of a closed configuration thereof (FIG. 1A), a perspective view of an open configuration thereof (FIG. 1B), a perspective view of a second opening configuration thereof (FIG. 1C), a perspective view similar to the previous one, but with additional details (FIG. 1D), a plan view with phantom parts of a closed configuration thereof (FIG. 1E); a plan view with phantom parts of an open configuration thereof (FIG. 1F);

FIGS. 2A, 2B, 2C, 2D, 2E, 2F show schematically a further exemplary embodiment of a container according to the present invention in, respectively, a perspective view of a closed configuration thereof (FIG. 2A), a side view of closed configuration thereof (FIG. 2B), a view in section on line B—B of FIG. 2A (FIG. 2C), a plan view of an open configuration thereof (FIG. 2D), a side view on an open configuration thereof (FIG. 2E), a view in section on line A—A of FIG. 2D (FIG. 2F);

FIGS. 3A, 3B, 3C, 3D show schematically a further exemplary embodiment of a container according to the present invention in, respectively, a perspective view of an open configuration thereof (FIG. 3A), a back view of a closed configuration (FIG. 3B), in a side view of a closed configuration (FIG. 3C), in a partial perspective view of an enlarged detail (FIG. 3D);

Figure 1A:
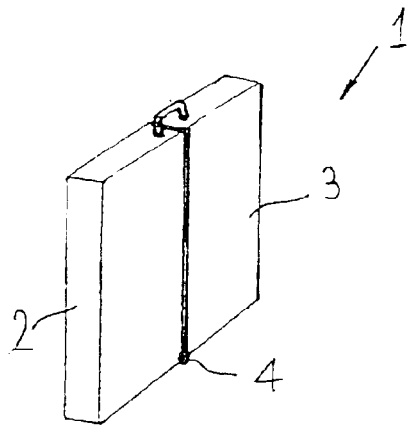
Figure 1B:
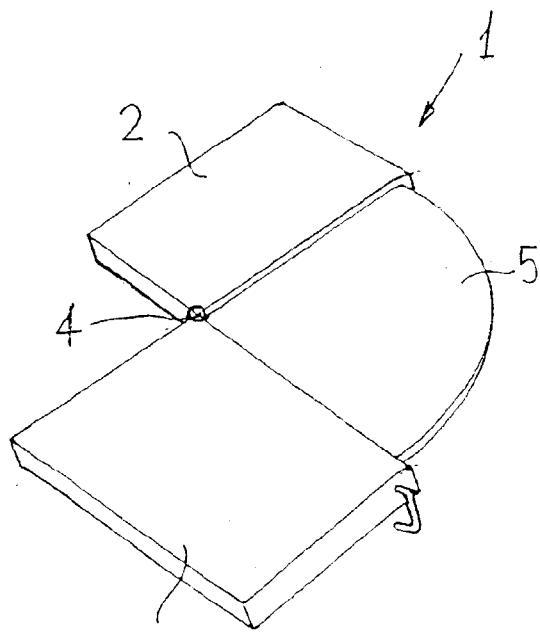
Figure 1C:
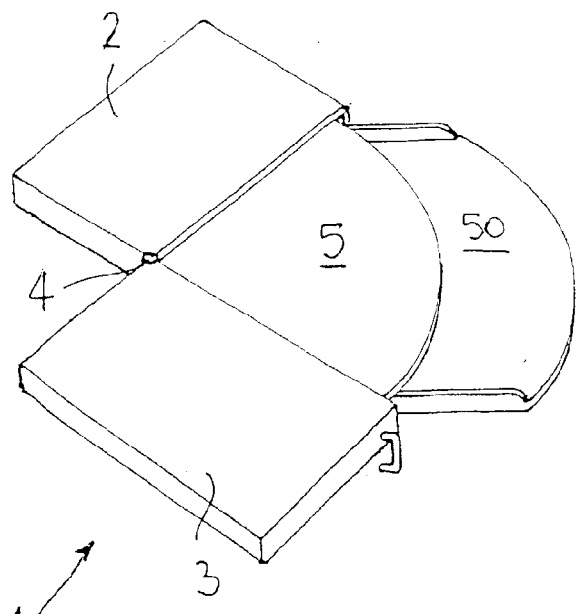
Figure 1E:
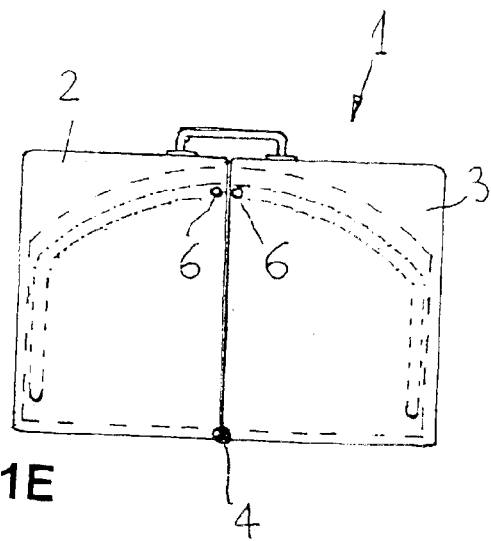

With reference to the figures of the attached drawings, and in particular to FIGS. 1A–F, a container (1) for portable electronic apparatus and instruments for one's own and/or professional use, according to the invention, comprises: an openable case (2, 3) holding therein at least a movable plane (5).

The openable case is composed of a first half-shell (2) and a second half-shell (3) disposed substantially coplanar and connected to each other via a relevant hinge (4) in correspondence of a common corner so that they can be disposed at least in a closed configuration in which they are side by side, and an open position in which they are separate.

The half-shells (2, 3) have a box-like shape being open in correspondence of a juxtaposed face, and are substantially rectangular in plan view. Advantageously, the two half-shells can be like each other: in this way it is possible to reduce the number of components required for making the container.

The movable plane (5), as above said, can be positioned internally of the half-shells (2, 3). More particularly, more than one plane can be provided, for example in number of two, as in the illustrated examples.

Means are also provided for guiding the movement of plane (5) relative to the half-shells (2, 3), which means consist of gudgeons or pins (6) sliding inside corresponding guides or slots (7, 8).

In particular, as shown by the examples, the pins (6) are associated with the half-shells (2, 3), whereas the guides (7, 8) are associated with the plane (5).

The plane (5) has a substantially rectangular shape with a side of curvilinear development; along its two parallel sides, the plane (5) has two parallel side-guides (7) joined to each other by a curved guide (8) located in correspondence of the curved portion of the plane (5).

As above mentioned, the pins or gudgeons (6) are seated within the guides of plane (5); upon opening the container (1), as the two half-shells (2, 3) are stretched apart (directions of arrows R), the pins (6) slide in the opposite portions of the guide (8) moving towards the outside of the plane (5), that is, up to one end of the side guides (7). In practice, the two ends of the guide (8) meet with the two side guides (7) thereby allowing the transit of the pins (6) in the latter guides. The insertion of the pins (6) into the guides (7) makes it possible a centrifugal and centripetal displacement (see arrows F) of the movable plane (5) relative to the two half-shells (2, 3). In one embodiment, not shown, the pins (6) can be associated with the plane (5), and the guides (7, 8) can be associated with the half-shells (2, 3).

Figure 2B:
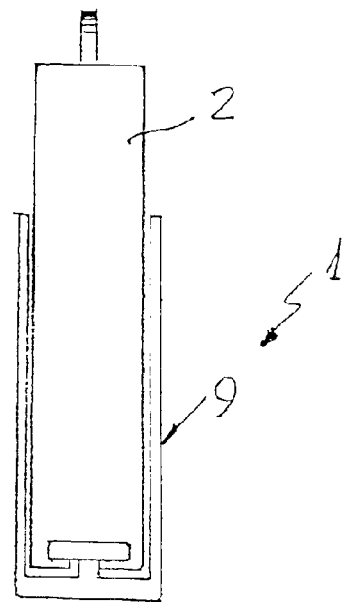
Figure 2F:
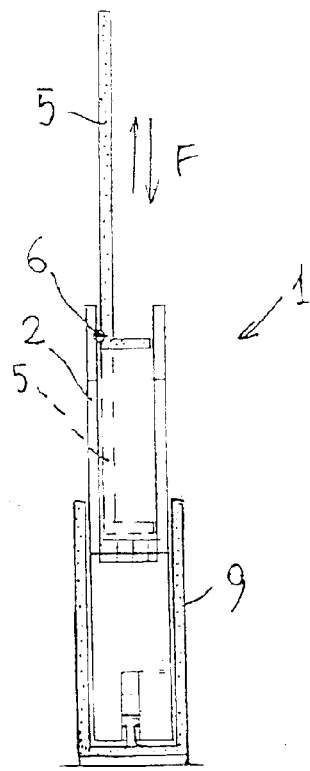
Figure 2A:
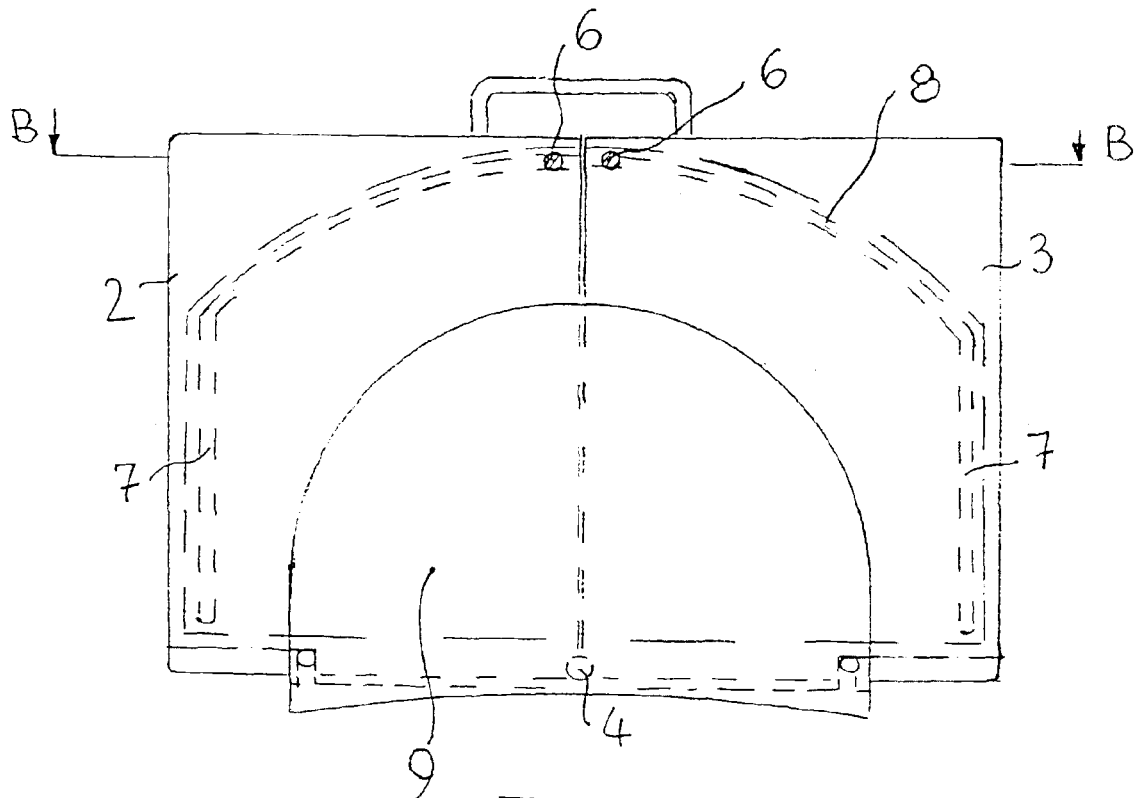
Figure 2C:
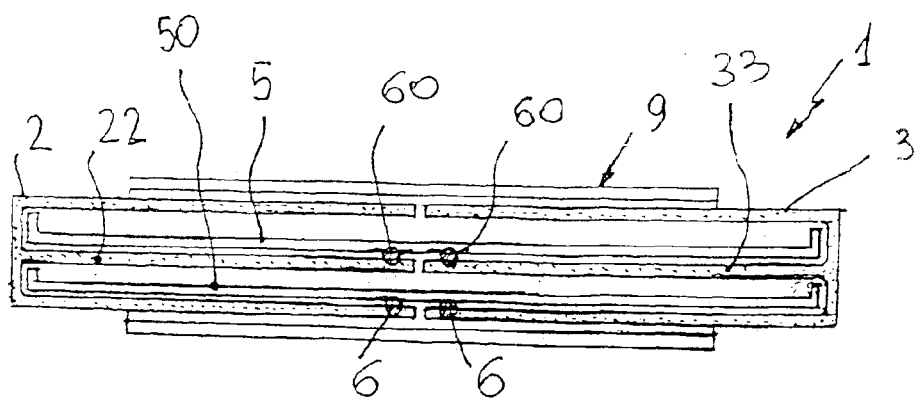
Figure 2D:
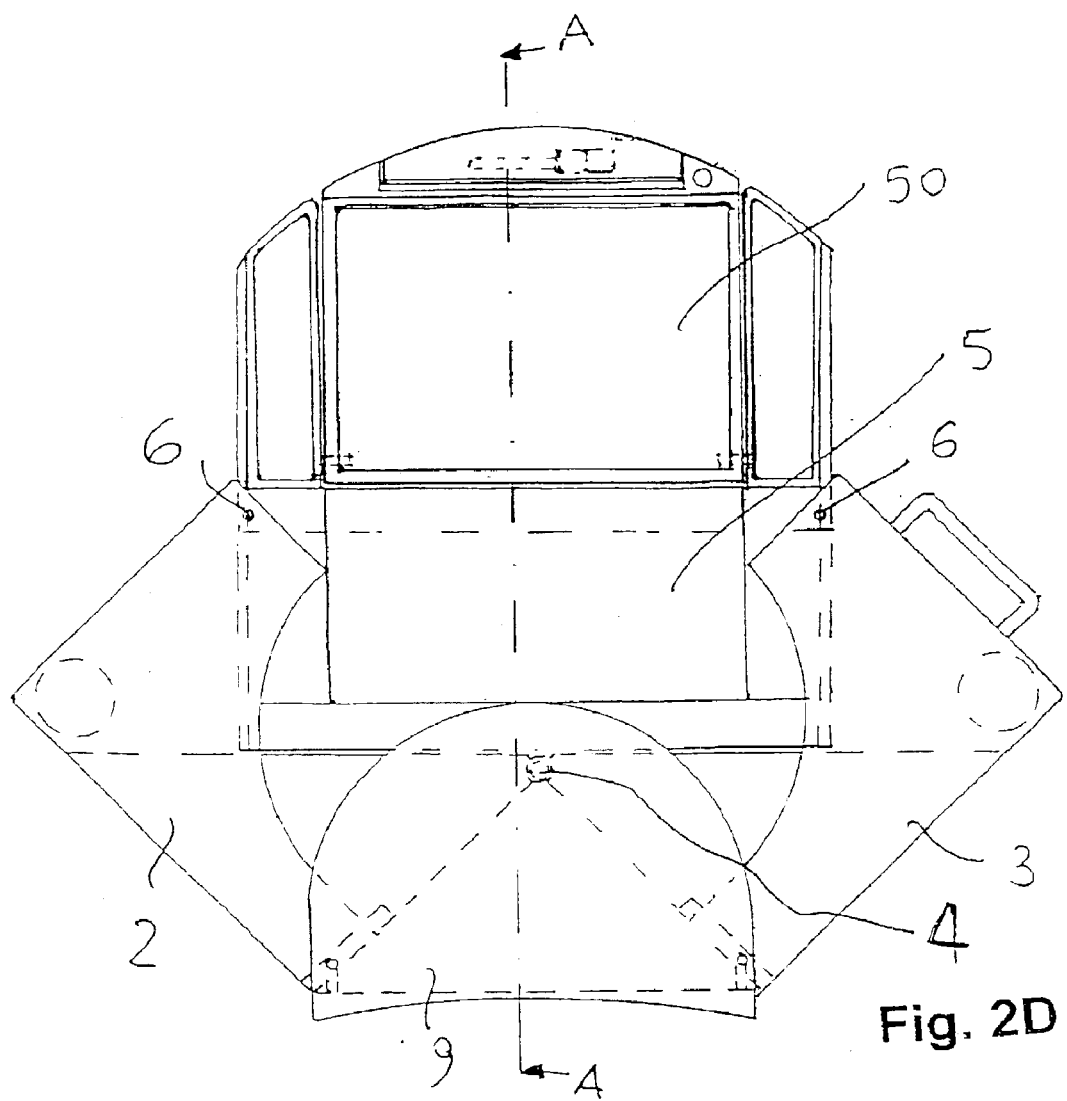
Figure 2E:
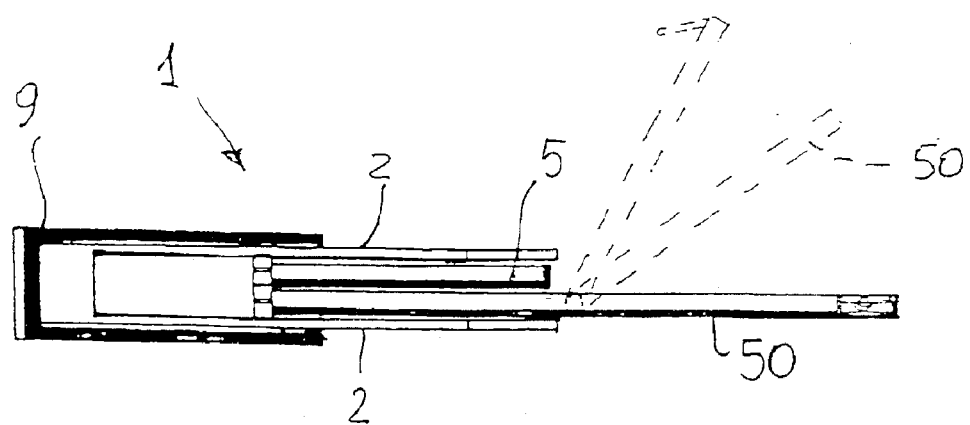

Either above or below the plane (5) provision is made for a second movable plane (50) which is, in turn, able to slide relative to plane (5). The movement between the two planes is made possible by further pins or projections (60) associated with the half-shells (or with the planes) and sliding in corresponding guides associated with the planes (or with the half-shells). In the embodiment shown more clearly in FIG. 2C, the two half-shells (2, 3) exhibit respective inner flaps (22, 33), that is, two half-partitions to be used for their interaction with each or both of the planes (5, 50) held inside the container (1).

Figure 1D:
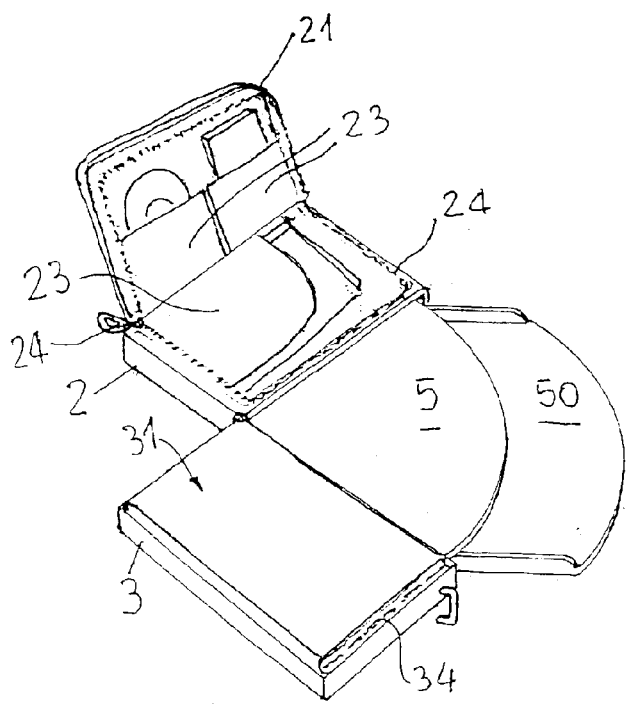
Figure 1F:
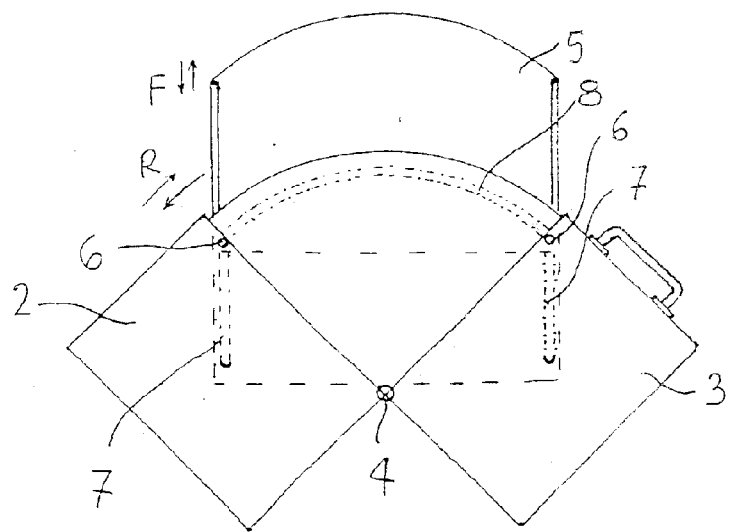

In the embodiment illustrated in FIG. 1D, the half-shells (2, 3) exhibit relevant additional storing elements (21, 31) which are joined to respective half-bodies (2, 3) in correspondence of the two sides of same half-bodies; the additional storing elements (21, 31) are connected to the half-bodies, along the remaining three sides, by means of hinges (24, 34) which allow the opening and closing of the additional storing elements (21, 31). The additional elements (21, 23) can be provided inside with one or more pockets such as those (23) of element (21) illustrated by the drawing.

In the embodiments illustrated in FIGS. 2A–F, 3A–D, the container (1) is provided with an outer element (9), for the connection and guide between of said half-shells (2, 3), allowing the same half-shells to rotate about the hinge (4). The connection element (9) has a substantial "C" shape in cross-section and surrounds the half-bodies (2, 3). The element (9) is provided with two pins or gudgeons (90) with heads (99) having larger cross-section, provision being also made for corresponding guides (29, 39) inside which the said heads (99) of pins (90) are seated and can slide over a predetermined length, so as to allow a stable positioning of the container in a closed configuration, in which the two half-shells result brought near to each other, and an open configuration, in which the two half-shells (2) define an angle of preset amplitude (which is 90° in the non-limiting illustrated example). The guides (29, 39) being able to be closed by relevant plugs (98).

Moreover, in the example of FIG. 3A, the half-bodies (2, 3) are provided with additional extractable elements (210, 310). Said elements (210, 310) may consist of drawers being movable, for example, in the directions (V) or (W) in FIG. 3A. To obtain such movements, the half-bodies (2, 3) will be provided with corresponding guides (not shown) wherein said drawers can slide.

In practice, with the present invention, the concept of a storing volume provided by traditional bags is replaced by a novel solution idea based on support surfaces provided by the container (1), so as to use the apparatus held therein without extracting it therefrom and using the same container in conjunction with the apparatus.

Figure 4:
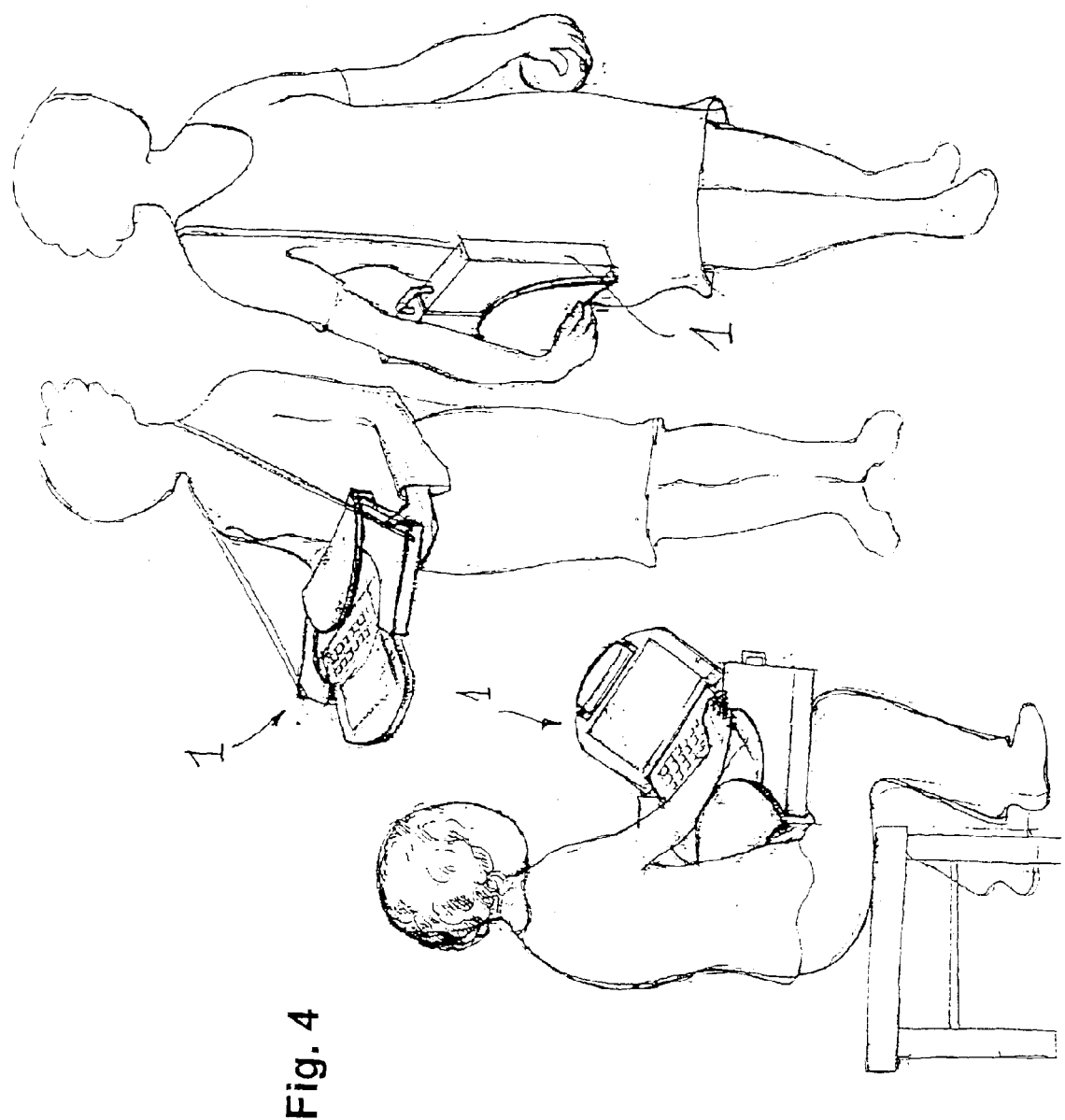
FIG. 4 shows schematically possible exemplary utilizations of the present invention.

In a further embodiment, shown schematically in FIG. 4, the parts making up the container can also be parts of the apparatus. By way of example, the plane (5) may consist of a video screen and the half-shells may contain, at least in part, the section relative to the processing unit of a personal computer.

What is claimed is:

1. Container for electronic apparatus and for tools of one's own or professional use, characterized in that it comprises:
    an openable case made up of a first half-shell (2) and a second half-shell (3) which are disposed substantially coplanar and connected to each other via a relevant hinge (4) in correspondence of a common corner, so that they can be disposed at least in a closed configuration in which they are juxtaposed, and an open position in which they are stretched apart;
    at least a movable plane (5) able to be positioned internally of said half-shells (2, 3);—means for guiding the movement of said plane (5) relative to said half-shells (2, 3), which means consist of projections or pins (6) slidingly fitted within corresponding guides or slots (7, 8).

2. Container according to claim 1, characterized in that said pins (6) are associated with said half-shells (2, 3) and said guides (7, 8) are associated with at least one plane (5).

3. Container according to claim 1, characterized in that said pins (6) are associated with said plane (5) and said guides (7, 8) are associated with said half-shells (2, 3).

4. Container according to claim 1, characterized in that said plane (5) exhibits two side guides (7) parallel to each other and which are extended and joined by a curved guide (8).

5. Container according to claim 1, characterized in that said half-shells (2, 3) have an open, box-like shape in correspondence of two juxtaposed faces and are substantially rectangular in plan view.

6. Container according to claim 1, characterized in that said at least one plane (5) has a substantially rectangular shape with one side of curvilinear development.

7. Container according to claim 1, characterized in that it comprises, inside said half-shells (2, 3), at least two movable planes (5, 50) mutually connectable to each other by pins and guides.

8. Container according to claim 1, characterized in that it is provided with an external element (9) for connecting and guiding said half-shells (2, 3) and able to rotate said half-shells about said hinge (4); said element (9) being provided with two pins or gudgeons (90) each having a head (99) of larger cross-section, and the said half-shells (2, 3) being provided of corresponding guides (29, 39) within which the heads (99) of said pins (6) can be fitted for sliding over a predetermined length so as to allow a stable positioning of the container in a closed configuration in which the two half-shells result brought near to each other, and an open configuration in which the two half-shells (2) are stretched apart thus defining an angle of preset amplitude.

* * * * *